United States Patent
Barton et al.

(10) Patent No.: US 9,510,181 B2
(45) Date of Patent: Nov. 29, 2016

(54) IMAGE-BASED REMOTE SUBSCRIBER IDENTITY MODULE ACTIVATION

(71) Applicant: T-Mobile USA, Inc., Bellevue, WA (US)

(72) Inventors: Jupiter Macleod Barton, Shoreline, WA (US); Sky Forrest Richard Ortiz, Snoqualmie, WA (US); Peter M. Francis, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 83 days.

(21) Appl. No.: 14/058,042

(22) Filed: Oct. 18, 2013

(65) Prior Publication Data
US 2015/0111573 A1 Apr. 23, 2015

(51) Int. Cl.
H04W 8/26 (2009.01)
H04W 8/24 (2009.01)
H04W 8/18 (2009.01)

(52) U.S. Cl.
CPC ............... *H04W 8/18* (2013.01); *H04W 8/183* (2013.01)

(58) Field of Classification Search
CPC ... H04W 12/00; H04W 88/02; H04W 12/06; H04W 8/00; H04W 8/22; H04W 8/205
See application file for complete search history.

(56) References Cited

U.S. PATENT DOCUMENTS

| 7,266,371 | B1 * | 9/2007 | Amin et al. | 455/419 |
|---|---|---|---|---|
| 2003/0172090 | A1 * | 9/2003 | Asunmaa et al. | 707/200 |
| 2004/0242209 | A1 * | 12/2004 | Kruis et al. | 455/414.1 |
| 2005/0021592 | A1 * | 1/2005 | Patel et al. | 709/200 |
| 2007/0064264 | A1 * | 3/2007 | Silverbrook et al. | 358/1.15 |
| 2007/0103566 | A1 * | 5/2007 | Aerrabotu et al. | 348/231.3 |
| 2007/0178883 | A1 * | 8/2007 | Nandagopal | 455/411 |
| 2007/0213050 | A1 * | 9/2007 | Jiang | 455/432.3 |
| 2007/0262160 | A1 * | 11/2007 | Narlinger et al. | 235/493 |
| 2008/0113687 | A1 * | 5/2008 | Prendergast et al. | 455/558 |
| 2008/0254766 | A1 * | 10/2008 | Craven | 455/407 |
| 2009/0119698 | A1 * | 5/2009 | Kuijlaars | 725/25 |
| 2010/0121736 | A1 * | 5/2010 | Kalke | 705/27 |
| 2010/0279655 | A1 * | 11/2010 | Larsson | 455/411 |
| 2010/0285834 | A1 * | 11/2010 | Hutchison, IV | 455/550.1 |
| 2011/0043652 | A1 * | 2/2011 | King et al. | 348/222.1 |
| 2011/0080871 | A1 * | 4/2011 | Beck et al. | 370/328 |
| 2011/0117966 | A1 * | 5/2011 | Coppinger | 455/558 |
| 2011/0159843 | A1 * | 6/2011 | Heath et al. | 455/411 |
| 2012/0077496 | A1 * | 3/2012 | Mathias et al. | 455/435.1 |
| 2012/0136739 | A1 * | 5/2012 | Chung | 705/26.1 |

(Continued)

FOREIGN PATENT DOCUMENTS

| EP | 2234423 A1 * | 9/2010 | ............ H04W 12/06 |
|---|---|---|---|
| EP | 2271146 A1 * | 1/2011 | |
| WO | WO 2004105421 A2 * | 12/2004 | ............... H04Q 7/38 |

*Primary Examiner* — Kashif Siddiqui
*Assistant Examiner* — Minjung Kim
(74) *Attorney, Agent, or Firm* — Lee & Hayes, PLLC

(57) ABSTRACT

A telecommunication device configured to capture an image of a unique identifier or a data representation code is described herein. The unique identifier or data representation code is associated with a subscriber identification module (SIM) for accessing a telecommunication service of a telecommunication service provider. The telecommunication device is further configured to provide the image or data extracted from the image to a remote activation server of the telecommunication service provider and receive, in response, an indication that the telecommunication service has been activated for the SIM.

17 Claims, 14 Drawing Sheets

(56) References Cited

U.S. PATENT DOCUMENTS

| | | | |
|---|---|---|---|
| 2012/0157055 A1* | 6/2012 | Ren et al. | 455/411 |
| 2012/0164982 A1* | 6/2012 | Klein | 455/411 |
| 2012/0184274 A1* | 7/2012 | Lopresti et al. | 455/435.1 |
| 2012/0196569 A1* | 8/2012 | Holtmanns et al. | 455/411 |
| 2012/0298736 A1* | 11/2012 | Haddad | 235/375 |
| 2014/0011491 A1* | 1/2014 | Zimmerman et al. | 455/419 |
| 2014/0087790 A1* | 3/2014 | Babbage et al. | 455/558 |
| 2014/0106728 A1* | 4/2014 | Aboulhosn et al. | 455/418 |
| 2014/0258819 A1* | 9/2014 | Chen et al. | 715/205 |
| 2015/0046918 A1* | 2/2015 | Rong et al. | 717/177 |

\* cited by examiner

IMAGE-BASED REMOTE SUBSCRIBER IDENTITY MODULE ACTIVATION

BACKGROUND

Historically, consumers of telecommunication services have subscribed to contracts with telecommunication service providers and have obtained their telecommunication devices, such as mobile phones, as part of those contracts. When a consumer's contract ends and the consumer sings up with a new telecommunication service provider, the consumer often obtains a new telecommunication device as part of the sign up process. Increasingly, however, consumers are switching between service providers and bringing their existing telecommunication devices into the new contract or new relationship.

To activate the existing telecommunication device for the new telecommunication service provider, the consumer typically must bring the telecommunication device to a facility, such as a store, of the new telecommunication service provider. Personnel at the store will provide the consumer with a new subscriber identity module (SIM) for accessing telecommunication services of the new telecommunication service provider, will activate the new SIM, and will inform the previous telecommunication service provider of the change to enable that service provider to deactivate its service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
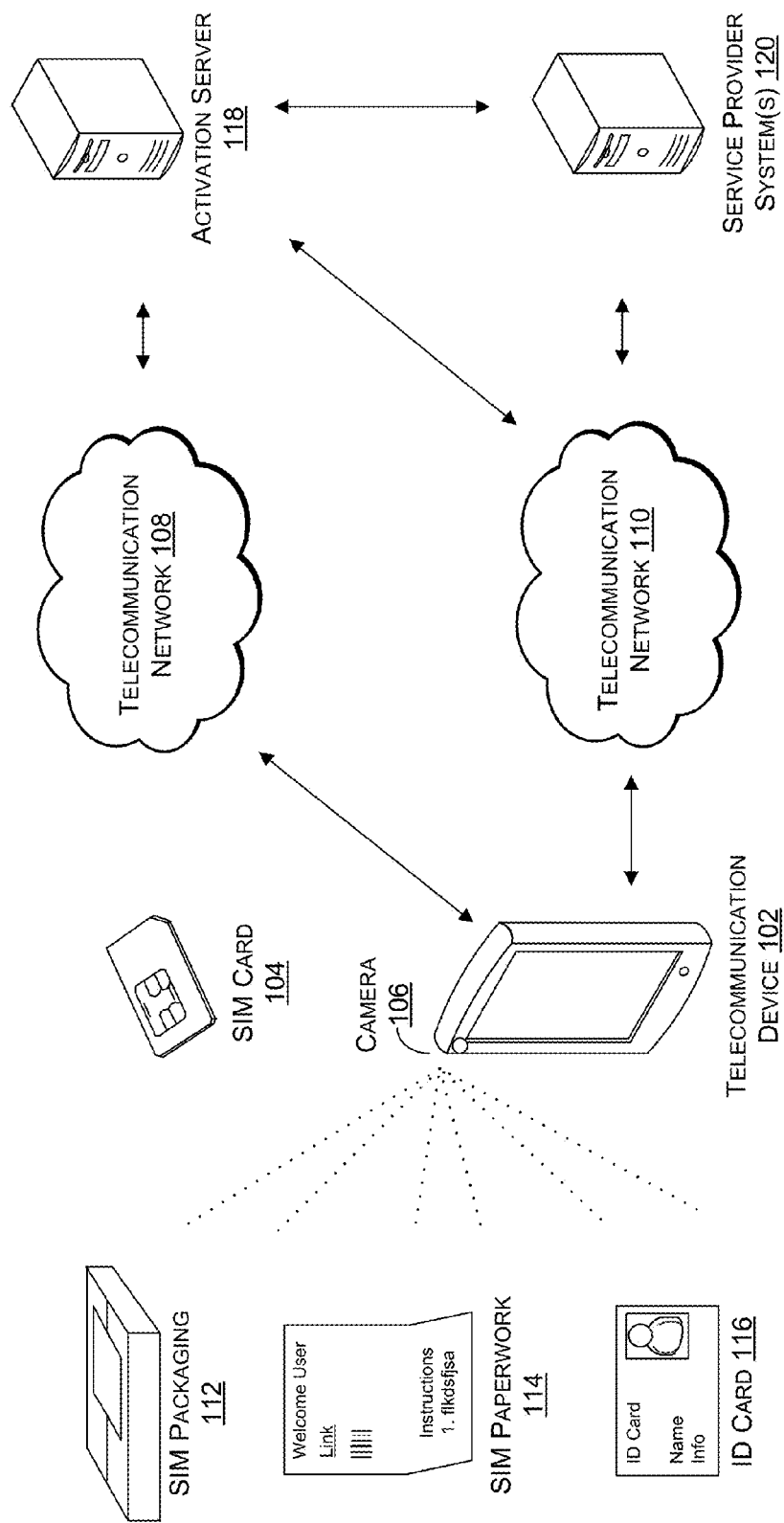
FIG. 1 illustrates an example environment including a telecommunication device configured to download an activation application, to capture an image of an identifier or code associated with a SIM, to provide that image or data extracted from it to a remote activation server, and to receive an indication that the SIM has been activated.

This disclosure describes, in part, a telecommunication device configured to capture an image of a unique identifier or a data representation code. The unique identifier or data representation code is associated with a subscriber identification module (SIM) for accessing a telecommunication service of a telecommunication service provider. The telecommunication device is further configured to provide the image or data extracted from the image to a remote activation server of the telecommunication service provider and receive, in response, an indication that the telecommunication service has been activated for the SIM.

In various embodiments, the operations of the telecommunication device (e.g., the capturing of the image, the providing of the image or data, the receiving of the indication, etc.) may be performed at least in part by an activation application of the telecommunication device. The telecommunication device may have downloaded and launched the activation application in response to an image capture by a user of the telecommunication device of a code or representation, such as a data representation code, a QR code, a bar code, a hyperlink, a textual string or number, or a visual representation. Responsive to capturing the image, the telecommunication device may retrieve a network address based on the code or representation in the captured image and may download the activation application from the network address. Alternatively, the telecommunication device may enable the user to manually key-in the network address in a web browser of the telecommunication device.

In addition to capturing the image of the unique identifier or data representation code associated with the SIM, the telecommunication device may be used to capture an image of an identification card of the user of the telecommunication device (e.g., driver's license, passport, etc.) and may provide the image of the identification card or data extracted from that image to the remote activation server. Alternatively, the telecommunication device may enable the user to manually key-in the unique identifier.

In some embodiments, the telecommunication device may receive a list of service plans from the remote activation server for the user to select from and may provide an indication of the user selection to the remote activation server.

The remote activation server, having received the image of the unique identifier or data representation code (or data extracted from that image) may then activate a telecommunication service of the telecommunication service provider for the SIM and notify the user of the telecommunication device that the telecommunication service has been activated. In some embodiments, the activation may also be based in part on the image of the identification card (or data extracted from that image) and/or on the selected service plan. The remote activation server may also notify another telecommunication service provider of the activation to enable that other telecommunication service provider to deactivate telecommunication service to the telecommunication device. This other telecommunication service provider may be a previous service provider of the telecommunication device and may have been used by the telecommunication device in the activation process for the SIM.

Along with receiving an indication of the activation, the telecommunication device may also receive instructions to remove an old SIM (e.g., a SIM of the other telecommunication service provider) and to place the activated SIM in the telecommunication device. Once the SIM has been placed in the telecommunication device, the telecommunication device may then be used to access telecommunication service of the telecommunication service provider.

Example Environment

FIG. 1 illustrates an example environment including a telecommunication device 102 configured to download an activation application, to capture an image of an identifier or code associated with a SIM card 104, to provide that image or data extracted from it to a activation server 118, and to receive an indication that the SIM card 104 has been activated.

Figure 3:
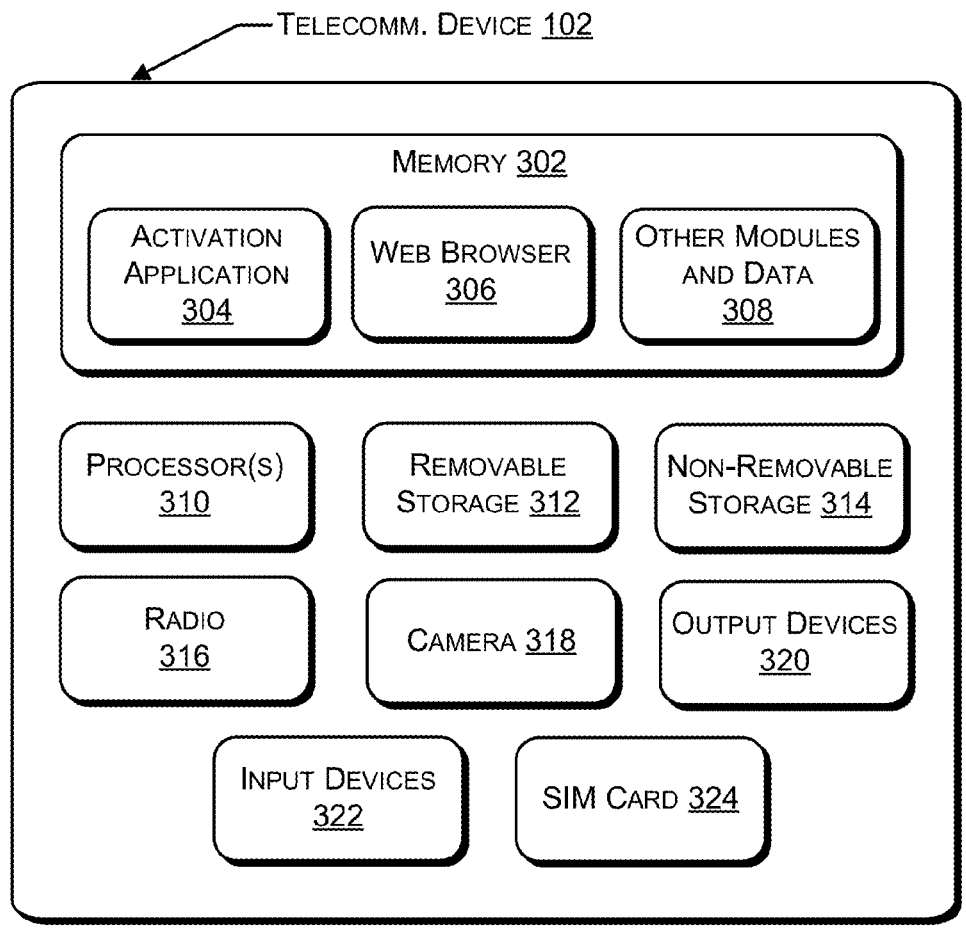
FIG. 3 illustrates a component level view of the telecommunication device illustrated by FIG. 1.

In various embodiments, the telecommunication device 102 may be any sort device capable of cellular or wireless network communication, such as a cellular phone, a tablet computer, a personal digital assistant (PDA), a personal computer (PC), a laptop computer, a media center, a work station, etc. An example telecommunication device 102 is illustrated in FIG. 3 and described below with reference to that figure.

The telecommunication device 102 may have at least one slot for a SIM card, such as SIM card 104 or a different SIM card. The SIM card (e.g., SIM card 104) is an integrated circuit storing an identifier and keys for accessing telecommunication services of a telecommunication service provider. Each SIM card is specific to a telecommunication service provider and is used by the telecommunication device 102 to access telecommunication services offered by that telecommunication service provider when that SIM card is placed in the slot. In some embodiments, the telecommunication device 102 may initially have a different SIM card in its slot and may use telecommunication services accessed by that different SIM card to activate telecommunication services for the SIM card 104. This may occur when, for instance, the user of the telecommunication device is switching from one telecommunication service provider associated with the different SIM card to another telecommunication service provider associated with the SIM card 104.

The telecommunication device 102 may also have a camera 106, which may be any sort of camera capable of capturing still or video images. As will be described further herein, the camera 106 may capture images used in activating the SIM card 104.

The telecommunication networks 108 and 110 may each be a telecommunication network of a telecommunication service provider that provides telecommunication services to the telecommunication device 102. The telecommunication networks 108 and 110 may include a core network and a plurality of access networks that are associated with base stations, nodeBs, eNodeBs, or other access points. In some embodiments, the core networks may include any of a number of nodes, such as a gateway GPRS (general packet radio service) support node (GGSN), a serving gateway (SGW), or packet data network gateway (PGW). The access networks of the telecommunication networks 108 and 110 may each be associated with a specific geographic area (e.g., a cell, a macrocell, a microcell, a femtocell, etc.). In some embodiments, the telecommunication networks 108 and 110 may each be a cellular network having spectrum to allocate for cellular communications.

In various embodiments, to activate telecommunication services accessed by the SIM card 104, the telecommunication device 102 either downloads an activation application or launches a web service. The user of the telecommunication device 102 may note instructions, codes, or representations on the packaging 112 or paperwork 114 accompanying the SIM card 104. For instance, the packaging 112 or paperwork 114 may include instructions for the user to open her web browser on the telecommunication device 102 and a link, such as a uniform resource location (URL) for the user to enter into that web browser. This may result in the downloading of the activation application or the launching of the web service. Alternatively, the packaging 112 or paperwork 114 may include instructions for the user to capture an image of a data representation code, a QR code, a bar code, a hyperlink, a textual string or number, or a visual representation, which may be disposed somewhere on the packaging 112 or paperwork 114. Capturing the image may cause the telecommunication device 102 to retrieve a network address from the data representation code, QR code, bar code, hyperlink, textual string or number, or visual representation contained in the image and to download the activation application from that network address. In order to retrieve the network address, the telecommunication device 102 may utilize other applications (e.g., QR code readers) or platform components. Such components may be capable of processing a data representation code, a QR code, a bar code, a hyperlink, a textual string or number, or a visual representation in order to recognize information from that data representation code, QR code, bar code, hyperlink, textual string or number, or visual representation. When downloading the activation application or launching the web service, the telecommunication device 102 may utilize the telecommunication network 110, which may be associated with a SIM card other than the SIM card 104 that is going to be activated. The other telecommunication network (telecommunication network 108) may be associated with the SIM card 104.

Once the activation application has been downloaded, the telecommunication device 102 may automatically launch the activation application or enable the user of the telecommunication device 102 to manually launch the activation application. Alternatively, the launched web service may automatically initiate an activation process. The following activation scenario is described as being performed by the activation application, but it is to be understood that any operation performed by the activation application could instead be performed by the web service.

Figure 2A:
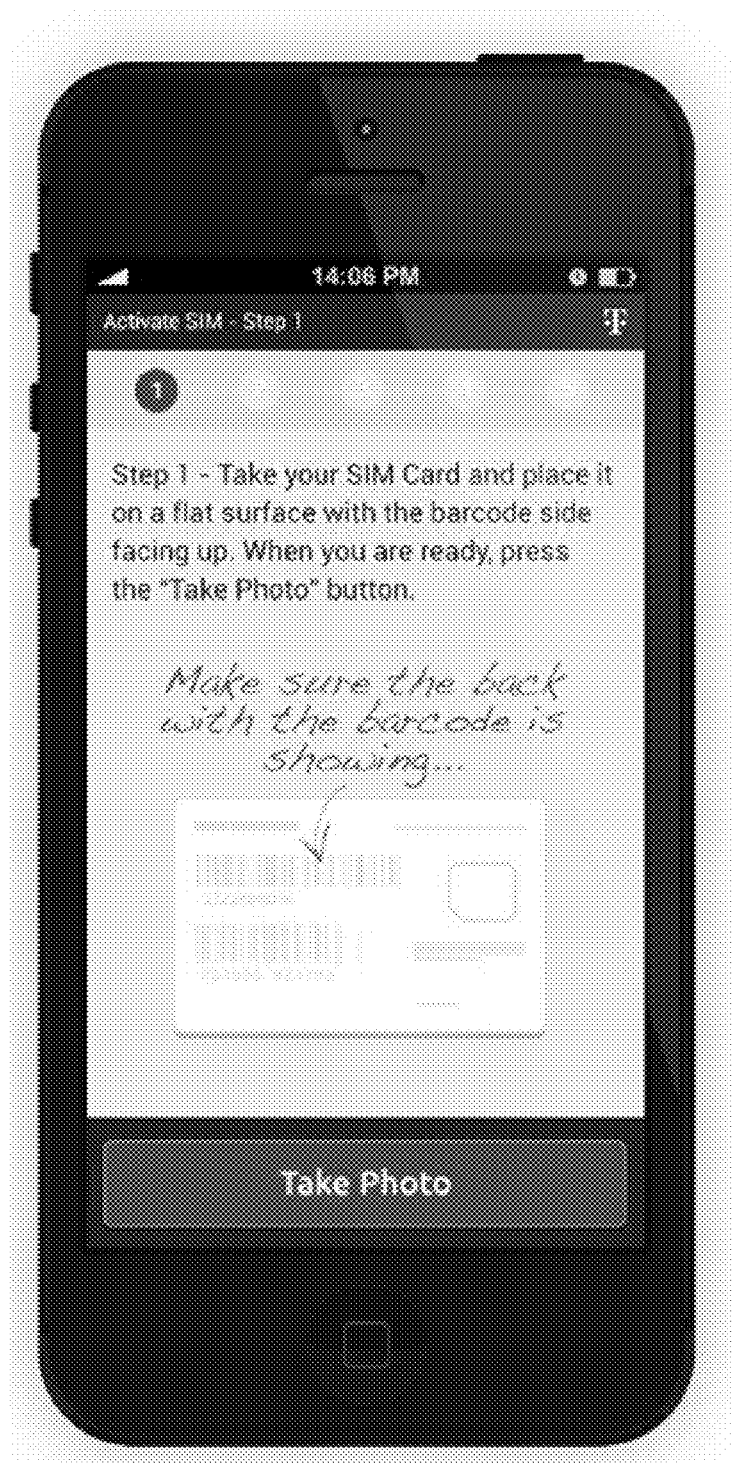
FIGS. 2a-2i illustrates example user interfaces of an activation application which guide a user through a SIM activation process.

The activation application may instruct the user through a sequence of operations illustrated in FIGS. 2*a*-2*i*. In FIG. 2*a*, the activation application instructs the user to capture an image of a unique identifier or data representation code associated with the SIM card 104. This unique identifier or data representation code may also be found on the packaging 112 or paperwork 114 and may be a bar code, a QR code, a textual string or number, or a visual representation. This unique identifier or data representation code may be the same as the representation or code used to download the activation application or may be a different, additional identifier or code.

Figure 2B:
Figure 2C:
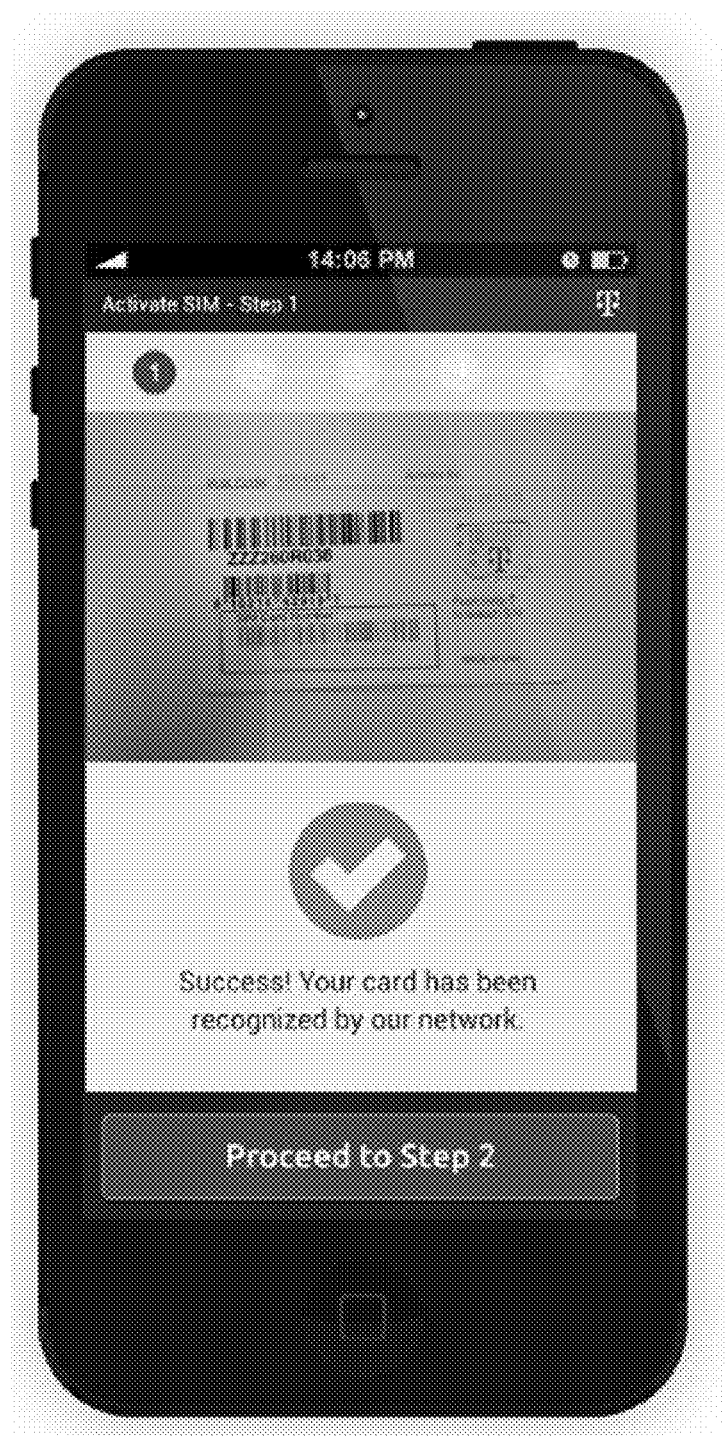

As shown in FIG. 2*b*, the camera window may then be opened and the user may capture an image of the unique identifier or data representation code using the camera 106. Upon capturing the image, the activation application may either send the image directly to a activation server 118 of the telecommunication network 108 or may first process the image to recognize the unique identifier or data representation code (e.g., by performing optical character recognition on the image) and may provide that extracted/recognized data to the remote activation service 118. The activation application may then receive an indication from the activation server 118 that the unique identifier or data representation code has been recognized and may provide an indication to the user, as shown in FIG. 2*c*, that the SIM card 104 associated with the unique identifier or data representation code has been recognized by the telecommunication service provider.

Figure 2D:
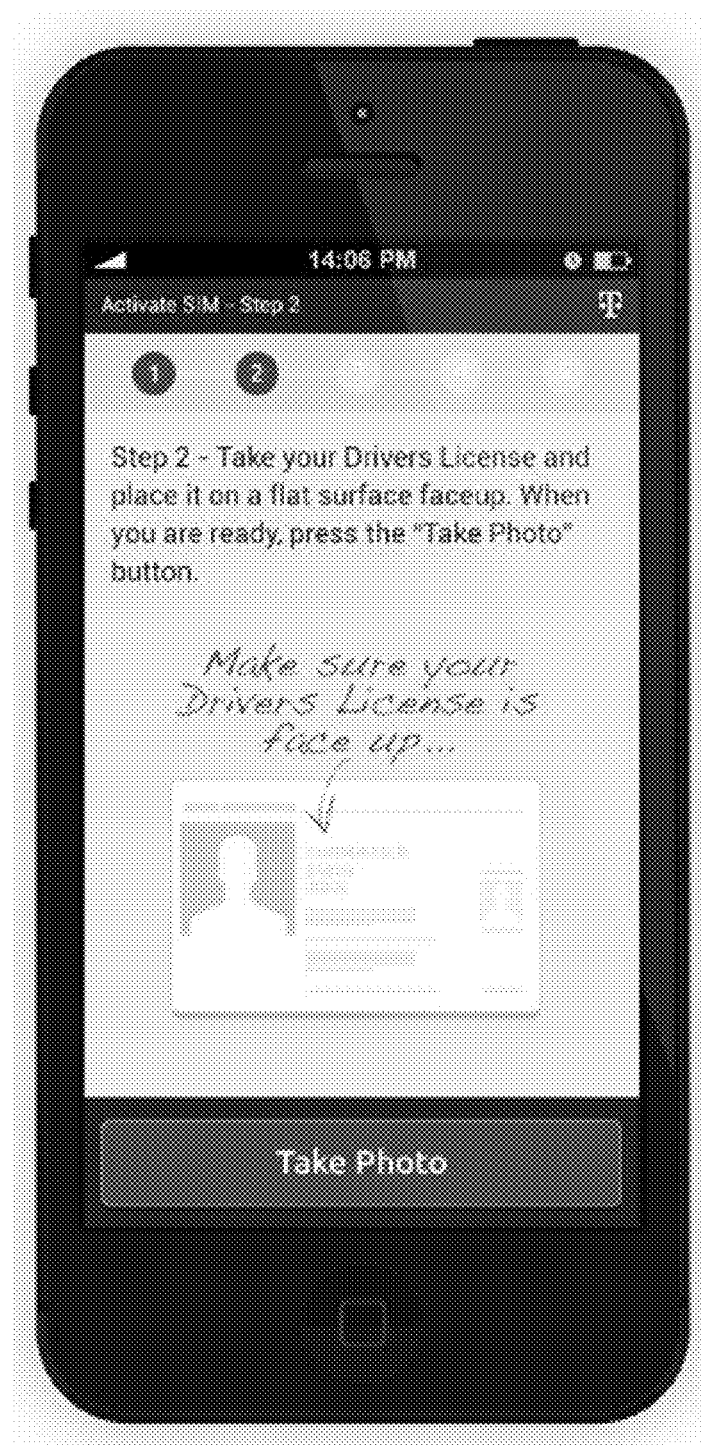
Figure 2E:
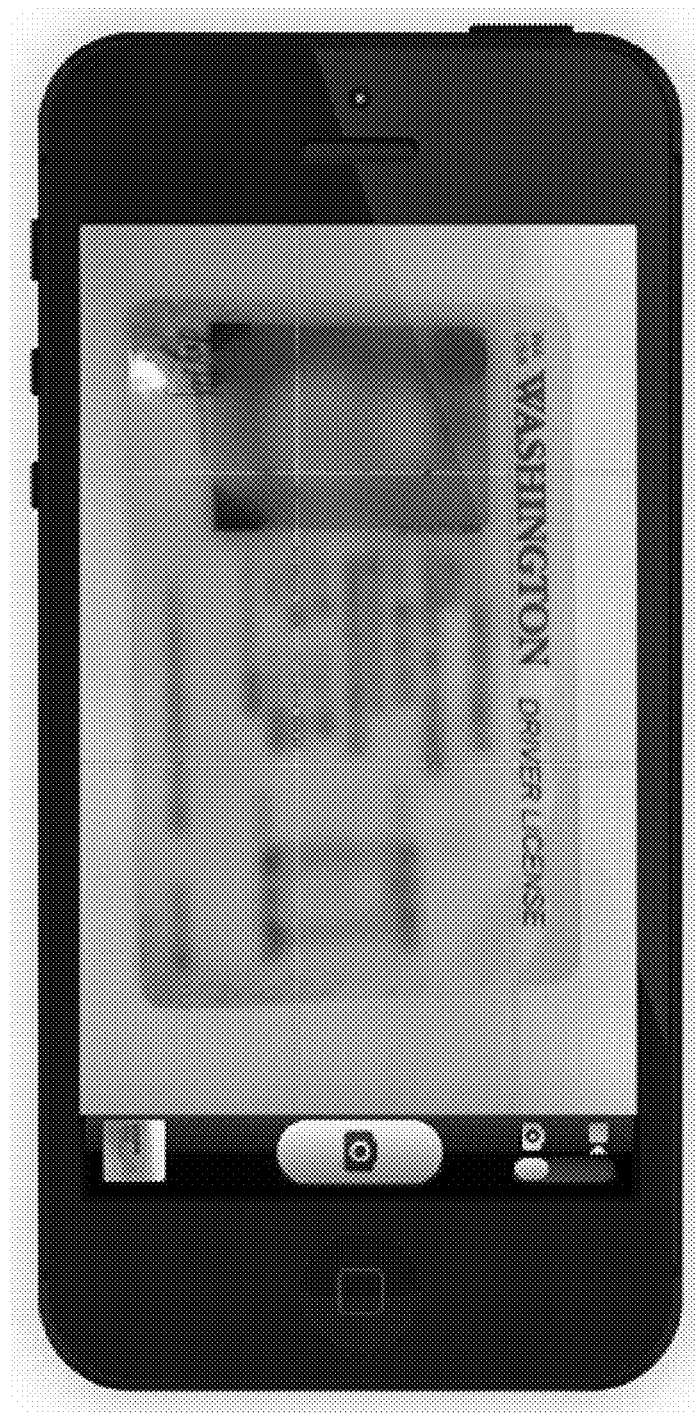
Figure 2F:
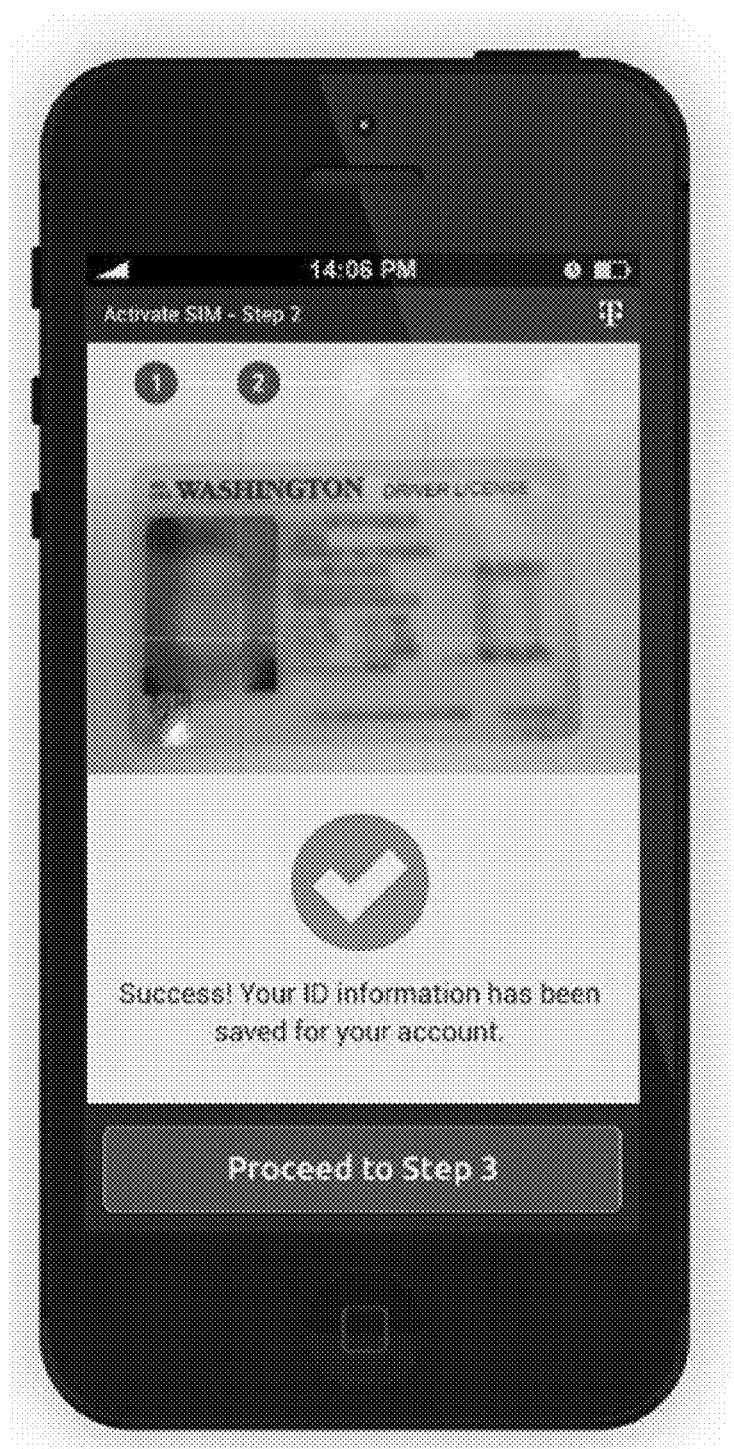

In various embodiments, as shown in FIG. 2d, the activation application may then instruct the user to take a picture of an identification card 116 of the user, such as a driver's license or passport. In FIG. 2e, the camera window may then be opened and the user may capture an image of the identification card 116 using the camera 106. Upon capturing the image, the activation application may either send the image directly to a activation server 118 of the telecommunication network 108 or may first process the image to recognize the information from the identification card 116 (e.g., by performing optical character recognition on the image) and may provide that extracted/recognized data to the remote activation service 118. The activation application may then receive an indication from the activation server 118 that the identification card 116 has been saved or validated and may provide an indication to the user, as shown in FIG. 2f, that the identification card 116 has been saved or validated.

Figure 2G:
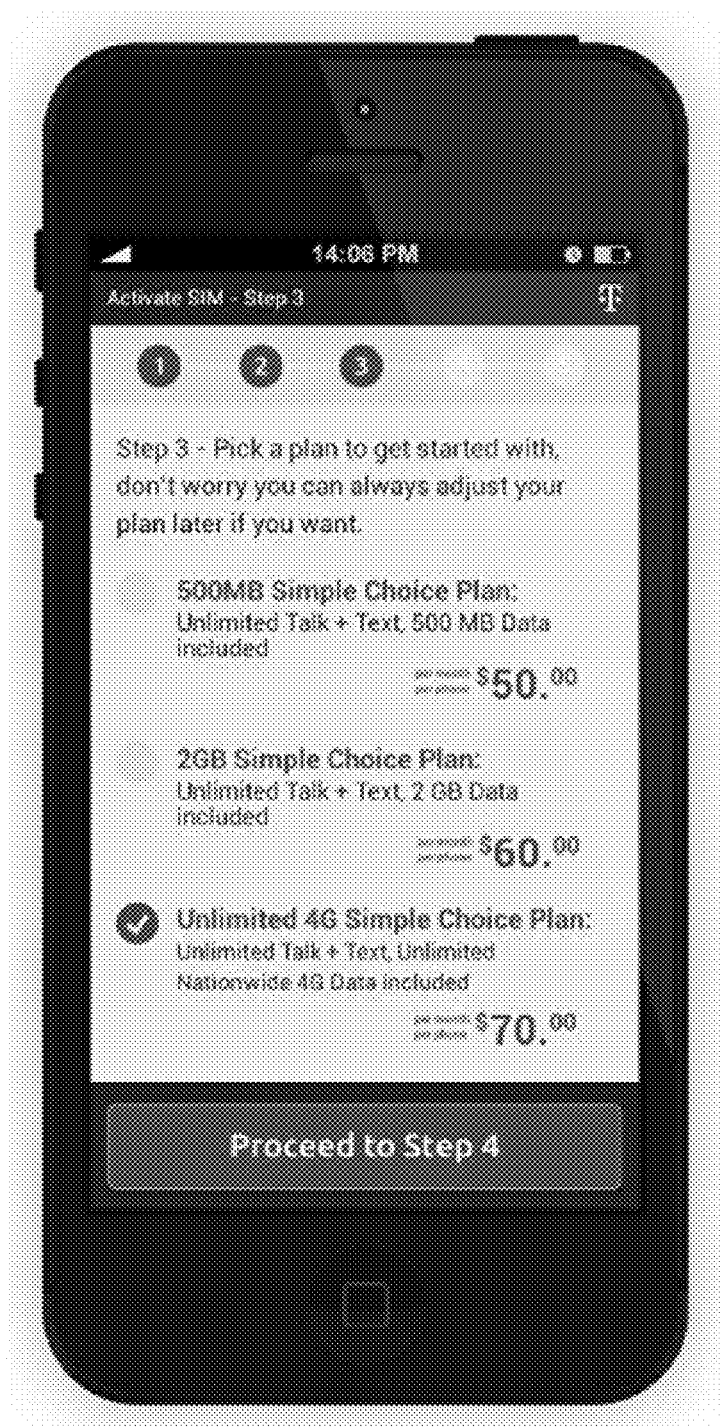

In some embodiments, as shown in FIG. 2g, the activation application may then present the user with a list of service plans for the user to select from. The activation application may have this list at the time of its download or may retrieve the list from the activation server 118. The activation application may then receive a user selection of the service plan and provide that selection to the remote activation application 118.

Figure 2H:
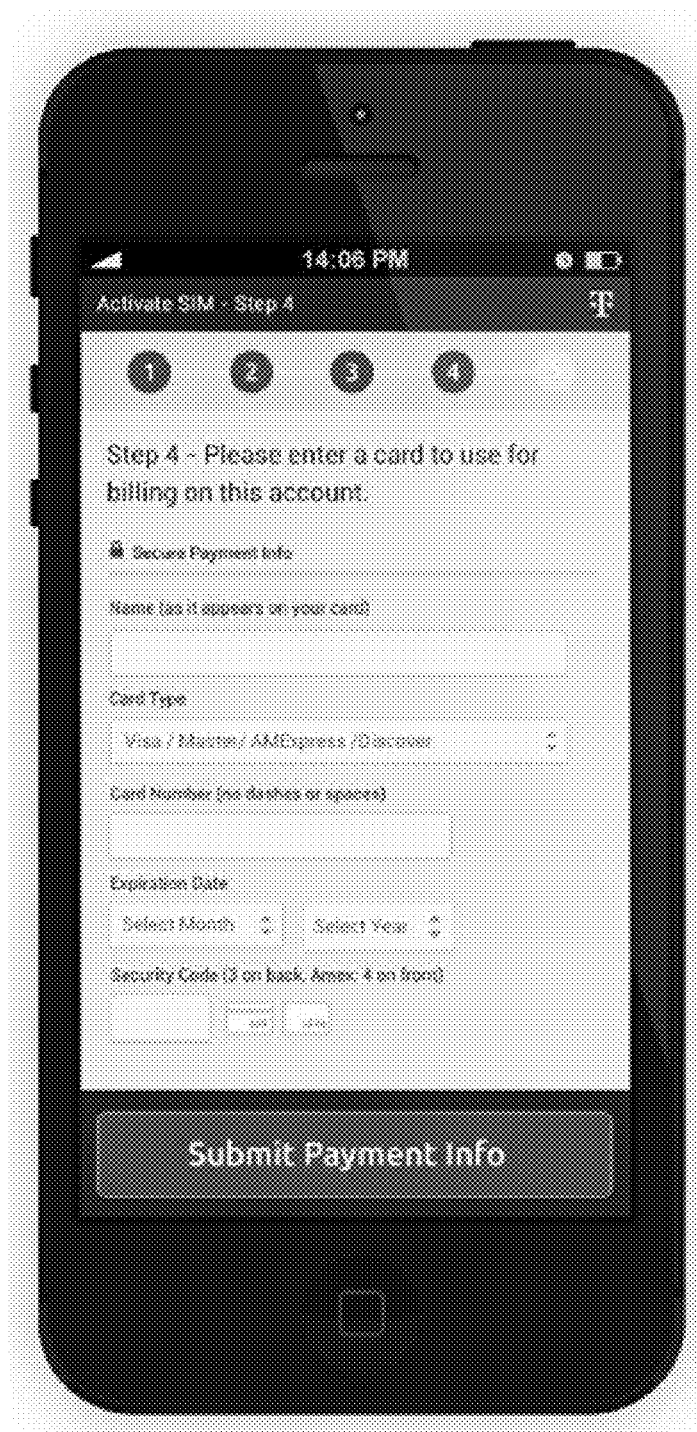

Next, as shown in FIG. 2h, the activation application may request payment information from the user (e.g., credit card information) which the user will use to pay for the selected telecommunication services. The activation application may then transmit this payment information to the activation server 118.

Figure 2I:

The activation application may then receive from the activation server 118 an indication that the selected telecommunication service(s) have been activated for the SIM card 104. As illustrated in FIG. 2i, the activation application may display the indication of activated service to the user and instruct the user to place the SIM card 104 in the SIM card slot of the telecommunication device 102. This may involve removing a SIM card associated with the telecommunication network 110. Once the SIM card 104 has been placed in the SIM card slot, the telecommunication device 102 may utilize the SIM card 104 to access the selected telecommunication service(s) over telecommunication network 108.

In various embodiments, the activation server 118 may be or include a server or server farm, multiple, distributed server farms, a mainframe, a work station, a personal computer (PC), a laptop computer, a tablet computer, an embedded system, or any other sort of device or devices. In one implementation, the activation server 118 represents a plurality of computing devices working in communication, such as a cloud computing network of nodes.

As mentioned above, the activation server 118 may be part of a telecommunication network 108 associated with a telecommunication service provider and may be responsible for activating telecommunication services for SIM cards, such as the SIM card 104, to enable those SIM cards to access telecommunication services via the telecommunication network 108. Prior to activation of the SIM cards, the activation server 118 may receive communications from a telecommunication device 102 seeking to activate telecommunication services via a different telecommunication network, such as telecommunication network 110. The telecommunication network 110 may communicate with the activation server 118 through, for example, a public wide area network, such as the Internet.

In various embodiments, the activation server 118 may receive images of unique identifiers or data representation codes, or data extracted from such images. Also, the activation server 118 may receive images of identification codes or data extracted from such images. If receiving the images themselves, the activation server 118 may process the images to recognize the content of the images (e.g., using optical character recognition). The activation server 118 may also receive indications of a selected service plan and payment information.

Based on all this received information, the activation server 118 may activate telecommunication services. For example, if images and information are received from the telecommunication device 102, the activation server 118 may activate telecommunication services for the SIM card 104. As part of this activation process, the activation server 118 may validate the unique identifier or data representation code in the image(s) and indicate to the telecommunication device 102 that the unique identifier or data representation code is valid. The activation server 118 may also save the identification information from the image of the identification card 116 and may, in some embodiments, verify that the identification card 116 is associated with an individual that the SIM card 104 was sent to. Once the telecommunication service has been activated, the activation server 118 provides an indication to the telecommunication device 102 of the activation.

In some embodiments, the activation server 118 also notifies service provider system(s) 120 of the telecommunication service provider of the telecommunication network 110 that the user of the telecommunication device 102 has activated the SIM card 104. Based on this notification, the service provider system(s) 120 may deactivate telecommunication service to the telecommunication device 102.

In further embodiments, the activation server 118 may also be associated with the network address used to download the activation application or launch the web service. In other embodiments, the network address may instead be associated with some other device or devices of the telecommunication network 108.

Example Devices

FIG. 3 illustrates a component level view of a telecommunication device 102. As illustrated, the telecommunication device 102 comprises a system memory 302 storing an activation application 304, a web browser 306, and other modules and data 308. Also, the telecommunication device 102 includes processor(s) 310, a removable storage 312, a non-removable storage 314, radio 316, a camera 318, output device(s) 320, input device(s) 322, and a SIM card 324.

In various embodiments, system memory 302 is volatile (such as RAM), non-volatile (such as ROM, flash memory, etc.) or some combination of the two. The activation application 304 and web browser 306 perform functions of the telecommunication device 102 described above in detail with regard to FIG. 1. The other modules or data 308 may comprise any sort of applications or platform components of the telecommunication device 102, as well as data associated with such applications or platform components.

In some embodiments, the processor(s) 310 is a central processing unit (CPU), a graphics processing unit (GPU), or both CPU and GPU, or any other sort of processing unit.

Telecommunication device 102 also includes additional data storage devices (removable and/or non-removable) such as, for example, magnetic disks, optical disks, or tape.

Such additional storage is illustrated in FIG. 3 by removable storage 312 and non-removable storage 314. Tangible computer-readable media may include volatile and nonvolatile, removable and non-removable media implemented in any method or technology for storage of information, such as computer readable instructions, data structures, program modules, or other data. System memory 302, removable storage 312 and non-removable storage 314 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the telecommunication device 102. Any such tangible computer-readable media may be part of the telecommunication device 102.

In some embodiments, the radio 316 includes any sort of radio known in the art. For example, radio 316 may include a radio transceiver that performs the function of transmitting and receiving radio frequency communications via an antenna. The radio 316 may facilitate wireless connectivity between the telecommunication device 102 and various cell towers, base stations and/or access points of the telecommunication network 108 or the telecommunication network 110. In addition to radio 316, the telecommunication device 102 may also include a wireless communication transceiver and a near field antenna for communicating over unlicensed wireless IP networks, such as local wireless data networks and personal area networks (e.g., Bluetooth or near field communication (NFC) networks).

The telecommunication device 102 also includes a camera 318 configured to capture images such as those described above in detail with respect to FIG. 1. Camera 318 may be an example of the camera 106 described above. The camera 318 may interface with the activation application 304, with an operating system of the telecommunication device 102 or with other modules or data 308 of the telecommunication device 102. In some embodiments, the camera 318 may be or include a video camera and may capture either or both of video or still images.

In some embodiments, the output devices 320 include any sort of output devices known in the art, such as a display (e.g., a liquid crystal display), speakers, a vibrating mechanism, or a tactile feedback mechanism. Output devices 320 also include ports for one or more peripheral devices, such as headphones, peripheral speakers, or a peripheral display.

In various embodiments, input devices 322 include any sort of input devices known in the art. For example, input devices 322 may include a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

In some embodiments, SIM card 324 may be the SIM card 104 described above in detail with respect to FIG. 1 or may be another SIM card utilized while activating the SIM card 104. As mentioned above, SIM card 324 may be an integrated circuit with identifiers and keys used to access telecommunication service of a telecommunication network.

Figure 4:
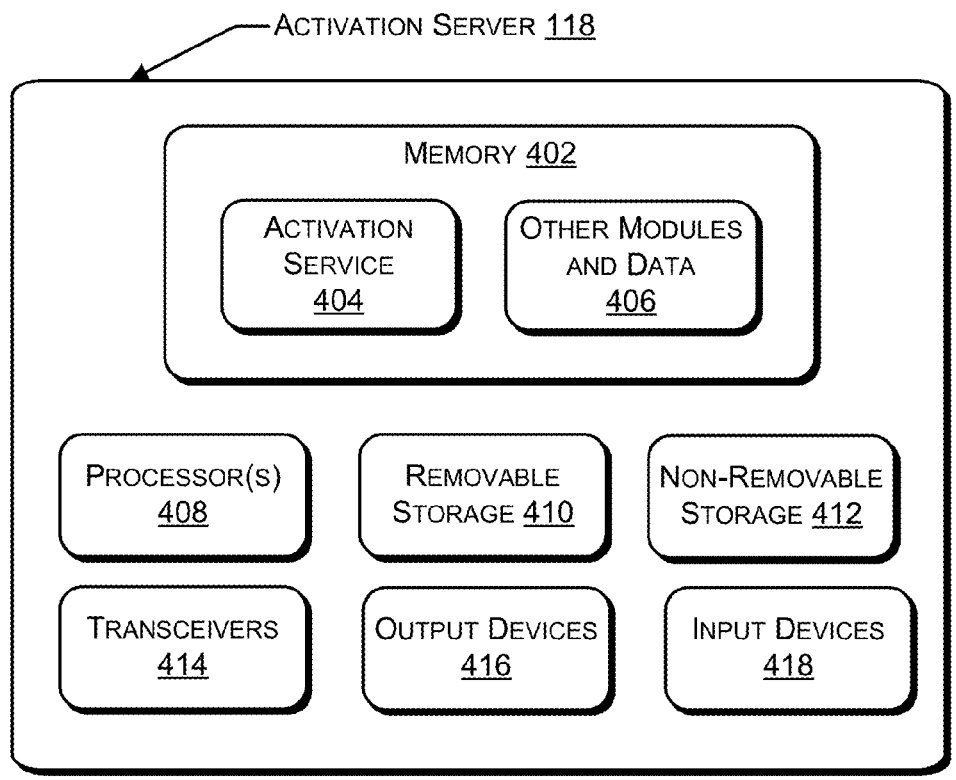
FIG. 4 illustrates a component level view of the activation server illustrated by FIG. 1.

FIG. 4 illustrates a component level view of an activation server 118. As illustrated, the activation server 118 comprises a system memory 402 storing an activation service 404 and other modules and data 406. Also, the activation server 118 includes processor(s) 408, a removable storage 410, a non-removable storage 412, transceivers 414, output device(s) 416, and input device(s) 418.

In various embodiments, system memory 402 is volatile (such as RAM), non-volatile (such as ROM, flash memory, etc.) or some combination of the two. The activation service 404 is described above in detail with regard to FIG. 1 as the logic enabling the operations of "activation server 118." The other modules or data 406 may comprise any sort of applications or platform components of the activation server 118, as well as data associated with such applications or platform components.

In some embodiments, the processor(s) 408 is a central processing unit (CPU), a graphics processing unit (GPU), or both CPU and GPU, or any other sort of processing unit.

Activation server 118 also includes additional data storage devices (removable and/or non-removable) such as, for example, magnetic disks, optical disks, or tape. Such additional storage is illustrated in FIG. 4 by removable storage 410 and non-removable storage 412. Tangible computer-readable media may include volatile and nonvolatile, removable and non-removable media implemented in any method or technology for storage of information, such as computer readable instructions, data structures, program modules, or other data. System memory 402, removable storage 410 and non-removable storage 412 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the activation server 118. Any such tangible computer-readable media may be part of the activation server 118.

In some embodiments, the transceivers 414 include any sort of transceivers known in the art. For example, transceivers 414 may include a radio transceiver that performs the function of transmitting and receiving radio frequency communications via an antenna. The radio may facilitate wireless connectivity between the activation server 118 and various nodes of the telecommunication network 108 or between the activation server 118 and routers or other devices of the Internet. In addition, the transceivers 414 may also include a wireless communication transceiver and a near field antenna for communicating over unlicensed wireless IP networks, such as local wireless data networks and personal area networks (e.g., Bluetooth or near field communication (NFC) networks). Further, the transceivers 414 may include wired communication components, such as an Ethernet port, that connect the activation server 118 in a wired fashion to one or more nodes of the telecommunication network 108 and routers or other devices of the Internet.

In some embodiments, the output devices 416 include any sort of output devices known in the art, such as a display (e.g., a liquid crystal display), speakers, a vibrating mechanism, or a tactile feedback mechanism. Output devices 416 also include ports for one or more peripheral devices, such as headphones, peripheral speakers, or a peripheral display.

In various embodiments, input devices 418 include any sort of input devices known in the art. For example, input devices 418 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 5:
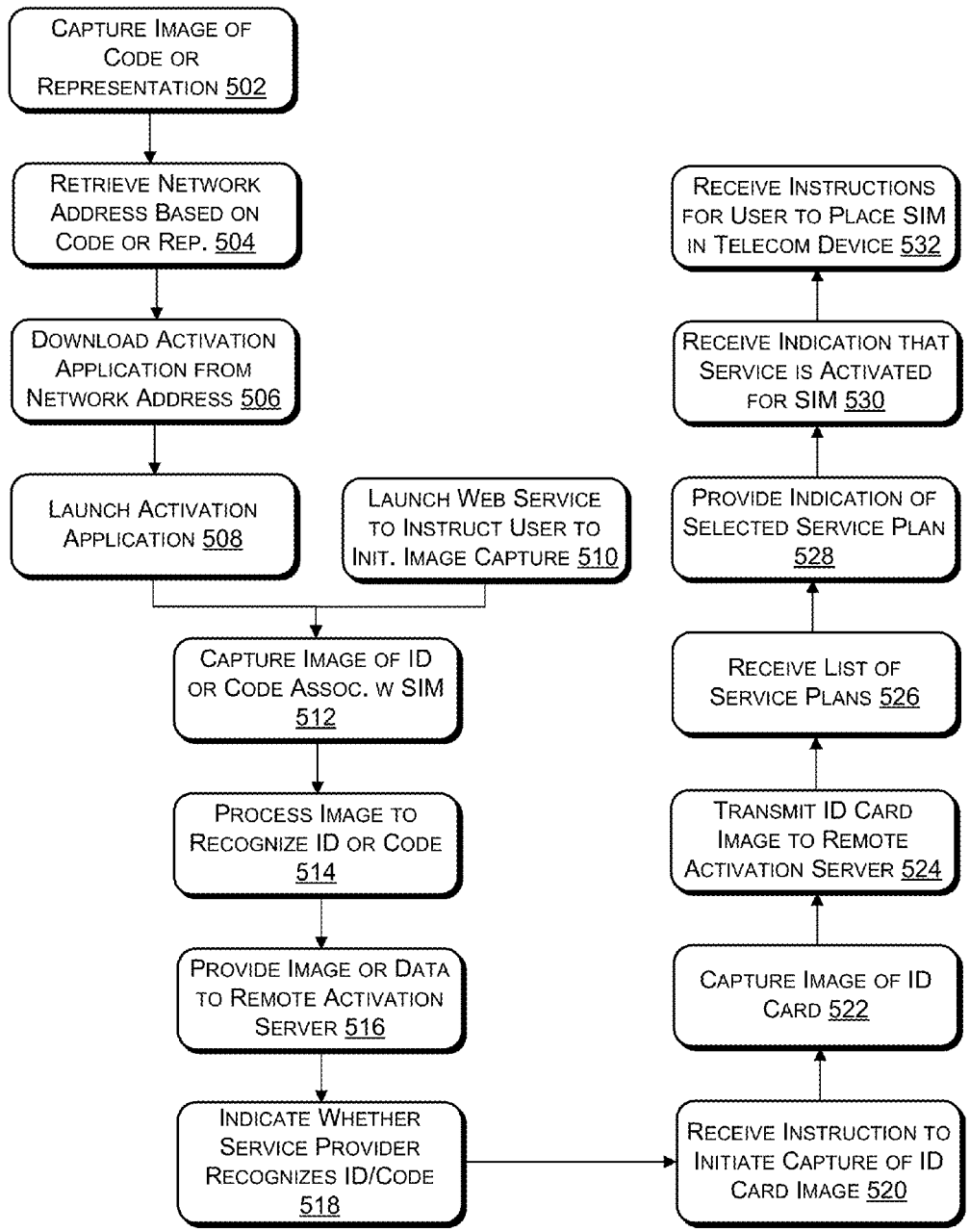
FIG. 5 illustrates an example process performed by a telecommunication device, the process including capturing an image of an identifier or code associated with a SIM, providing that image or data extracted from it to a remote activation server, and receiving an indication that the SIM has been activated.
Figure 6:
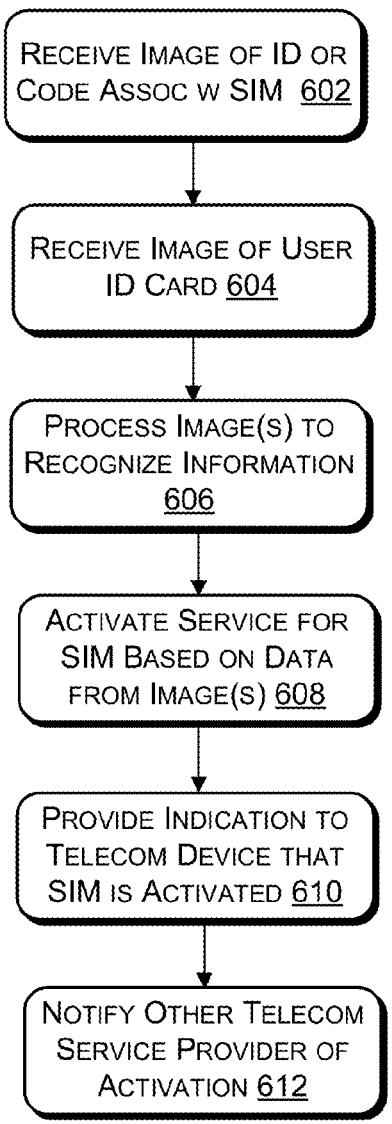
FIG. 6 illustrates an example process performed by an activation server of a telecommunication service provider, the process including receiving, from a telecommunication device, an image or data associated with an identifier or a code, the identifier or code in turn associated with a SIM, activating the SIM based at least in part on the identifier or the code, and providing an indication of the activation to the telecommunication device.

FIGS. 5 and 6 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process performed by a telecommunication device, the process including capturing an image of an identifier or code associated with a SIM, providing that image or data extracted from it to a remote activation server, and receiving an indication that the SIM has been activated. The process includes, at 502, a telecommunication device capturing an image of a data representation code, a QR code, a bar code, a hyperlink, a textual string or number, or a visual representation. The data representation code, QR code, bar code, hyperlink, textual string or number, or visual representation may be found on packaging or paperwork accompanying a SIM for accessing telecommunication service of a telecommunication service provider. At 504, the telecommunication device retrieves a network address based on information obtained from the image of the data representation code, the QR code, the bar code, the hyperlink, the textual string or number, or the visual representation and, at 506, downloads an activation application from the network address. At 508, responsive to downloading the activation application, the telecommunication device automatically launches the activation application or enables the user of the telecommunication device to manually launch the activation application. The activation application instructs a user of the telecommunication device to initiate the capturing of the image of a unique identifier or a data representation code associated with the SIM. The unique identifier or data representation code may be any of a QR code, a bar code, a hyperlink, a textual string or number, or a visual representation. In some embodiments, the unique identifier or data representation code may be the same element of packaging or paperwork which resulted in the download of the activation application. In other embodiments, the unique identifier or data representation code may be a different element of the packaging or paperwork accompanying the SIM.

Alternatively to the operations shown at 502-508, the telecommunication device may, at 510, launch a web service to instruct the user to initiate capture of the image of the unique identifier or data representation code.

At 512, the telecommunication device captures the image of the unique identifier or data representation code. The telecommunication device may do this in response to user initiation of the capture (e.g., through the activation application) or may do so automatically at the direction of the activation application or web service. At 514, the telecommunication device may then process the image to recognize the unique identifier or the data representation code and, at 516, provide the image or data extracted from the image (e.g., the recognized unique identifier or data representation code) to a remote activation server of the telecommunication service provider. At 518, responsive to the providing, the telecommunication device may indicate to a user of the telecommunication device whether the telecommunication service provider recognizes the unique identifier or the data representation code.

At 520, the telecommunication device receives, from the activation application, an instruction for the user to initiate a capture of an image of an identification card of the user and at 522, captures the image of the identification card responsive to an action by the user. The telecommunication device may then process the identification card to recognize information contained by the card. At 524, the telecommunication device then transmits the image of the identification card or data extracted from that image to the remote activation server.

At 526, the telecommunication device may then receive from the telecommunication service provider a list of service plans for a user of the telecommunication device to select from and may, at 528, provide an indication of a selected service plan from the list of service plans to the remote activation server.

At 530, the telecommunication device may then receive from the remote activation server an indication that the telecommunication service has been activated for the SIM. At 532, the telecommunication device may also receive, with the indication, instructions for a user of the telecommunication device to place the SIM in the telecommunication device. The telecommunication device will be enabled to access the activated telecommunication service when the SIM has been placed in the telecommunication device.

In some embodiments, the providing at 516 and the receiving at 530 may be performed wirelessly over a telecommunication network of the telecommunication service provider or over a telecommunication network of another telecommunication service provider. The telecommunication device may receive active telecommunication service from the other telecommunication service provider through the operations shown from 502-528.

FIG. 6 illustrates an example process performed by an activation server of a telecommunication service provider, the process including receiving, from a telecommunication device, an image or data associated with an identifier or a code, the identifier or code in turn associated with a SIM, activating the SIM based at least in part on the identifier or the code, and providing an indication of the activation to the telecommunication device. The process includes, at 602, an activation service of a telecommunication service provider receiving from a telecommunication device an image or data extracted from the image. The image may be an image of a unique identifier or a data representation code associated with a SIM for accessing a telecommunication service of the telecommunication service provider.

At 604, the activation service may further receive an image of an identification card of a user of the telecommunication device.

At 606, the activation service may further process either or both of the images received at 602 and 604 to recognize information contained in the images.

At 608, the activation service may activate the telecommunication service for the SIM based at least in part on the image or the data extracted from the image of the unique identifier or the data representation code. In some embodiments, the activation service may further activate the telecommunication service based at least in on an association between the user depicted in the identification card and the SIM.

At 610, the activation service may provide an indication to the telecommunication device of the activation of the telecommunication service for the SIM.

At 612, the activation service may notify another telecommunication service provider associated with the telecommunication device of the activation to enable the other telecommunication service provider to terminate telecommunication service offered by the other telecommunication service provider to the telecommunication device.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media having stored thereon computer-executable instructions which, when executed by a telecommunication device, cause the telecommunication device to perform operations comprising:
   capturing a first image of a data representation code, a QR code, a bar code, a hyperlink, a textual string or number, or a visual representation on packaging or paperwork associated with a subscriber identification module (SIM) for accessing a telecommunication service of a telecommunication service provider;
   retrieving a network address based on information obtained from the first image of the data representation code, the QR code, the bar code, the hyperlink, the textual string or number, or the visual representation; and
   downloading an activation application from the network address, wherein the activation application enables or performs:
      capturing a second image of a unique identifier or a data representation code associated with the SIM, the unique identifier or the data representation code being different from the data representation code, the QR code, the bar code, the hyperlink, the textual string or number, or the visual representation on the packaging or the paperwork,
      providing the image or data extracted from the image to a remote activation server of the telecommunication service provider, and
      receiving an indication that the telecommunication service has been activated for the SIM.

2. The one or more non-transitory computer-readable media of claim 1, wherein the operations further comprise receiving, with the indication, instructions for a user of the telecommunication device to place the SIM in the telecommunication device, wherein the telecommunication device is enabled to access the activated telecommunication service when the SIM has been placed in the telecommunication device.

3. The one or more non-transitory computer-readable media of claim 1, wherein the operations further comprise:
   responsive to the providing, receiving from the telecommunication service provider a list of service plans for a user of the telecommunication device to select from; and
   providing an indication of a selected service plan from the list of service plans to the remote activation server, wherein the activated telecommunication service is associated with the selected service plan.

4. A method comprising:
   capturing, by a telecommunication device, an image of a data representation code, a QR code, a bar code, a hyperlink, a textual string or number, or a visual representation;
   retrieving, by the telecommunication device, a network address based on information obtained from the image of the data representation code, the QR code, the bar code, the hyperlink, the textual string or number, or the visual representation;
   downloading, by the telecommunication device, an activation application from the network address;
   capturing, by the activation application on the telecommunication device, with a camera associated with the telecommunication device, an image of a unique identifier or a data representation code associated with a subscriber identification module (SIM) for accessing a telecommunication service of a telecommunication service provider;
   providing, by the activation application on the telecommunication device, the image or data extracted from the image to a remote activation server of the telecommunication service provider; and
   receiving, by the activation application on the telecommunication device, an indication that the telecommunication service has been activated for the SIM.

5. The method of claim 4, further comprising, responsive to downloading the activation application, launching the activation application, wherein the activation application instructs a user of the telecommunication device to initiate the capturing of the image of the unique identifier or the data representation code.

6. The method of claim 5, further comprising:
   receiving, from the activation application, an instruction for the user to initiate a capture of an image of an identification card of the user;
   capturing the image of the identification card; and
   providing the captured image of the identification card or data extracted from the captured image of the identification card to the remote activation server.

7. The method of claim 4, further comprising processing the image to recognize the unique identifier or the data representation code.

8. The method of claim 4, further comprising receiving, with the indication, instructions for a user of the telecommunication device to place the SIM in the telecommunication device, wherein the telecommunication device is enabled to access the activated telecommunication service when the SIM has been placed in the telecommunication device.

9. The method of claim 4, wherein the unique identifier or the data representation code is one of a bar code, a QR code, a textual string or number, or a visual representation.

10. The method of claim 4, wherein the unique identifier or the data representation code is provided to the user with the SIM on packaging or paperwork associated with the SIM.

11. The method of claim 4, further comprising, responsive to the providing, indicating to a user of the telecommunication device whether the telecommunication service provider recognizes the unique identifier or the data representation code.

12. The method of claim 4, further comprising:
responsive to the providing, receiving from the telecommunication service provider a list of service plans for a user of the telecommunication device to select from; and
providing an indication of a selected service plan from the list of service plans to the remote activation server, wherein the activated telecommunication service is associated with the selected service plan.

13. The method of claim 4, wherein the providing includes providing the image or data to the remote activation server through a connection between the telecommunication device and a different telecommunication service provider, the different telecommunication service provider being associated with a different SIM of the telecommunication device utilized by the telecommunication device in establishing the connection.

14. The method of claim 13, further comprising receiving active telecommunication service from the different telecommunication service provider when performed the capturing and providing.

15. A system comprising:
one or more processors; and
an activation service operated by the one or more processors to perform operations including:
receiving from a telecommunication device an image or data extracted from the image, wherein the image is captured by a camera associated with the telecommunication device and is an image of a unique identifier or a data representation code associated with a subscriber identification module (SIM) for accessing a telecommunication service of a telecommunication service provider;
based at least in part on the image or the data extracted from the image, activating the telecommunication service for the SIM; and
providing an indication to the telecommunication device of the activation of the telecommunication service for the SIM,
wherein the activation service is further to notify another telecommunication service provider associated with a different SIM of the telecommunication device of the activation to enable the other telecommunication service provider to terminate telecommunication service offered by the other telecommunication service provider to the telecommunication device.

16. The system of claim 15, wherein the activation service is further to receive an image of an identification card of a user of the telecommunication device and to activate the telecommunication service based at least in on an association between the user depicted in the identification card and the SIM.

17. The system of claim 15, wherein the activation service is further to process the image to recognize the unique identifier or the data representation code.

* * * * *